No. 886,682. PATENTED MAY 5, 1908.
J. H. DELANY.
ELECTRIC HEATER AND RHEOSTAT.
APPLICATION FILED AUG. 23, 1906.

WITNESSES
Max B. A Doring
L. F. Browning.

INVENTOR
James H. Delany
BY
Edward C. Davidson
ATTORNEY

UNITED STATES PATENT OFFICE.

JAMES H. DELANY, OF BERWYN, ILLINOIS, ASSIGNOR TO THE ELECTRIC CONTROLLER & SUPPLY COMPANY, OF CLEVELAND, OHIO, A CORPORATION OF OHIO.

ELECTRIC HEATER AND RHEOSTAT.

No. 886,682.  Specification of Letters Patent.  Patented May 5, 1908.

Application filed August 23, 1906. Serial No. 331,707.

*To all whom it may concern:*

Be it known that I, JAMES H. DELANY, a citizen of the United States, residing in Berwyn, county of Cook, State of Illinois, have invented an Improved Electric Heater and Rheostat, of which the following is a specification.

This invention relates to a novel form and arrangement of an electrical conductor for use in rheostats and electrical heating devices and for similar and analogous uses; and also to mounting or supporting such conductors on cores or bases of insulating material.

In carrying out this invention, a strip of metal, or other suitable electrical conducting material of proper cross sectional area is, by appropriate rollers forming tools or dies, distorted, one of its edges being made thinner. The operation of so unevenly reducing the thickness of the strip causes it to continually bend in a circular path, each complete circle overlapping the others, thus converting the strip into a spiral. In use, these spirals will be so held and controlled that the adjacent coils will be separated, thus providing air spaces for the dissipation of heat, from the surfaces of the coils. The sectional areas of the coils could be of such form that for a given conductivity of the coiled strip, a maximum surface is provided with sufficient strength and rigidity of the coils. To provide a suitable base or support for such formed spiral conductors, it is proposed to use an insulating cylindrical core or frame which will preferably be screw threaded or have spiral guide grooves or notches formed in its periphery, in which the inner edge of the spiral strip will seat in such manner as to hold it firmly in position with its coils separated.

Figure 1:
Figure 2:
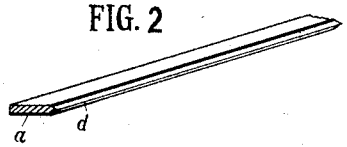
Figure 3:
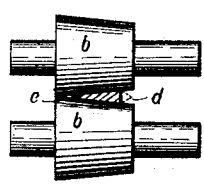
Figure 4:
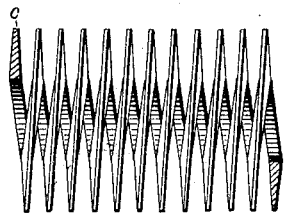
Figure 5:
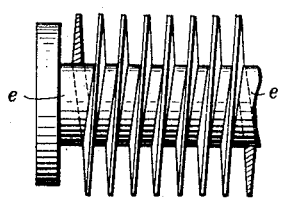
Figure 11:
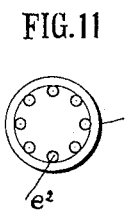
Figure 7:
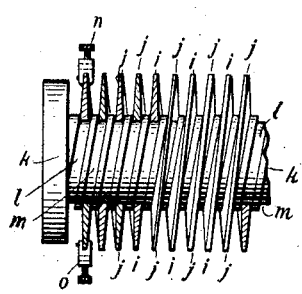
Figure 8:
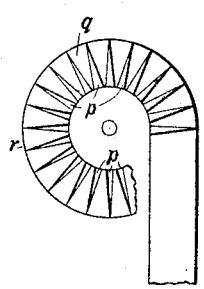

To describe my invention more particularly reference will now be had to the accompanying drawings in which:

Figure 1, represents a strip of material suitable for use in making the spiral electrical conductor of this invention; Fig. 2 is a transverse section of a strip of such material, showing another form of same; Fig. 3 illustrates a pair of rollers suitable for forming and spirally shaping strips of material, as metal; Fig. 4 represents a spiral coil made according to this invention; Fig. 5 is an illustration of such a coil seated on a core of insulating material; Fig. 6 a similar illustration showing a modification of the spiral holding threads or grooves of the core; Fig. 7, a like view showing another modification; Fig. 8 is a front end view of a spiral formed from a flat strip of metal by transversely crimping it; Fig. 9 shows in cross-section a wedge shaped strip that may be used to produce the desired spiral conductors; Fig. 10 shows the cross-section to which such strip may be rolled in forming it into a spiral; Fig. 11, an end view of one form of spiral supporting core; and Fig. 12, shows another arrangement of rolls for producing the spiral strip.

In the manufacture of electrical conductors according to this invention, a strip of material of suitable cross section, such as $a$ is, by rolling between suitably formed rollers $b, b$, Fig. 3, distorted in such manner that one of its edges $c$ is reduced in thickness, in such way that the strip is caused to assume a uniform spiral, Fig. 4. For certain uses of such coiled electrical conductors, the strip may have both of its edges flat, as shown at Fig. 1, or one of the edges may be otherwise than flat, as, for instance, it may be formed with angular faces, as shown at $d$, Fig. 2, and also shown by dotted lines at Fig. 3. This angular or other shaped edge $d$ will constitute the inner edge of the coiled strip.

To mount the coiled strip for practical use, it is proposed to provide a cylindrical core $e$ of a size to snugly fit in the central opening of the spiral coil. The periphery of the core $e$ may be plain, in which case the inner edge of the spiral conductor may be flat, and the conductor be placed and fixed on the core so as to leave a space between the coils which may or may not have a small strip of insulating material placed thereon close against the periphery of the core or wound between the spirals of the strip. It is preferred, however, to provide the core $e$ with a spiral groove $f$ and to form the inner edge of the spiral coil, as at $d$ in the manner before described. To provide suitable terminals for the spiral conductor, pieces of metal $g$ and $h$ may be soldered or otherwise fastened to the ends of the spiral.

Two or more spiral conductors, as may be required in a rheostat or electrical heater, may be placed on one core, provided with the requisite number of screw threads or grooves, if such be used. At Fig. 7, two spirals marked $i$ and $j$ are shown applied to a core $k$, which is provided with two grooves $l$ and $m$, in which respectively are seated the two spirals *i* and *j*. The two ends of each of the spirals *i* and *j* may be provided with suitable terminals *n* and *o* respectively.

Spiral electrical conductors embodying the features of this invention may be made from a strip, of metal or other suitable material, of uniform thickness by fluting or crimping the strip in such manner that the full desired corrugations will be formed by such process at one edge only of the strip, the corrugations vanishing towards the other edge, leaving the edge unaffected thereby, as shown at Fig. 8; the result being that the strip will be caused to assume a spiral form; the greatest depth of the corrugations *p* of the strip *q* being at the inner edge of the coil, the outer edge *r* of which is by the forming process merely bent into spiral form without other distortion. The base of the inner edge in this case is increased proportionately to the decrease or contraction of its length under the fluting or crimping operation.

By rolling a strip having a taper cross (such as shown in Fig. 9) into rectangular cross section (as in Fig. 10) obviously the thicker side of the strip will be lengthened and the strip caused to assume a spiral form. Such rolling may be affected by rolls whose coöperating faces are parallel, and the rolls may be of the bevel or miter type shown in Fig. 12.

Fig. 11 shows a supporting core comprising a head $e'$ from which extend parallel rods $e^2$ upon which the spiral may be mounted. This affords complete ventilation.

I claim as my invention:

1. A heater and rheostat consisting of the combination of a spirally formed laterally flattened electrical conductor, the cross-section of the coils of which is reduced in thickness from the central part of the spiral to its outer boundary, and a core or support of insulating material having a screw thread formed on its periphery adapted to hold the spiral by the inner edge of its coils.

2. In a heater and rheostat the combination with a cylindrical core of insulating material provided with a spiral groove in its periphery, of a flattened laterally tapered electrical conductor spirally formed with its narrow edge exteriorly arranged and having its wider inner edge shaped to fit or seat in the screw thread of the cylindrical core.

In testimony whereof, I have hereunto subscribed my name.

JAMES H. DELANY.

Witnesses:
 HARRY H. BARNUM,
 MABEL RICHARDS.